United States Patent [19]

Weymouth et al.

[11] Patent Number: 4,458,357
[45] Date of Patent: Jul. 3, 1984

[54] CIRCUIT BOARD IDENTITY GENERATOR

[75] Inventors: William M. Weymouth, Fountain Valley; Dilip Shah, Mission Veijo, both of Calif.

[73] Assignee: Basic Four Corporation, Tustin, Calif.

[21] Appl. No.: 293,503

[22] Filed: Aug. 17, 1981

[51] Int. Cl.³ .............................................. G06F 13/00
[52] U.S. Cl. ......................................... 377/2; 377/31; 377/33; 365/236; 365/239; 364/200
[58] Field of Search ................................ 377/2, 33, 31; 235/61 PM, 61 PD; 307/238.3, 595, 596, 597, 602; 365/233, 236, 239, 240; 364/137, 140, 701, 200, 900

[56] References Cited

U.S. PATENT DOCUMENTS

4,000,487 12/1976 Patterson et al. .................. 364/200
4,280,199 7/1981 Osakabe et al. .................... 365/236

Primary Examiner—Joseph A. Orsino, Jr.
Assistant Examiner—Timothy K. Greer

[57] ABSTRACT

A plurality of identical circuit board identification generators are individually located on an associated plurality of circuit boards in a computer system, each generator providing a unique identification for each associated circuit board. Identification numbers are automatically and sequentially generated by the generators upon the initial system turn on or upon a resetting of the system. The generators comprise a counter and logic circuitry for enabling the counters. The counters are initially disabled and pre-set to a maximum count. The first counter is then enabled and counts from the maximum to zero, and delivers an enable signal to the logic circuitry in the next circuit board to enable that counter. The enable signals propagate from board to board until the last board commences its count, at which time all counters are disabled. In this manner, N circuit boards will be identified as boards "O" through "N−1." Additional circuitry may be provided to extend the counting range and to identify the boards as "1" through "N," if desired.

14 Claims, 8 Drawing Figures

CIRCUIT BOARD IDENTITY GENERATOR

DESCRIPTION OF THE INVENTION

The present invention is related to apparatus for automatically producing a unique identification code for a number of circuit boards in an electronic system.

In general, many computer systems employ a plurality of similar electronic subsystems, such as a plurality of input/output devices, a plurality of microprocessors, and the like. When these computer systems employ such plural subsystems, it is necessary to identify each of the individual electronic subsystems to enable the computing system to selectively choose a unique electronic subsystem when necessary.

For example, computer systems usually include a number of peripheral devices such as disc drives, printers, and the like. It is therefore necessary that each of the peripheral devices be uniquely identifiable by the computer system, such that an individual peripheral device may be selected for an operation. Specifically, assuming that the computing system employs a plurality of disc units, circuitry associated with each disc must provide an individual identification number such that each disc drive can be uniquely identified and chosen by the computing system.

Usual prior art techniques of identifying the various subsystems include the use of a "strap" circuit or a "switch" circuit. The strap or switch circuit is provided on the circuit board of each subsystem to be identified. Both types of circuits provide a plurality of identification bit lines, each of the bit lines providing either a logical high ("1") or logical low ("0") level, the combination of the plurality of identification bit lines producing an identification number (i.e., "1011") unique to the particular apparatus. In the strap circuits, each of the individual identification bit lines is permanently attached or "strapped" to either the logical high or logical low level, while the switch circuits selectively apply each of the individual identity bit lines to either the logical high or logical low level via individual thumb-wheel or toggle switches, the switches being manually set to provide any particular identification number. The logical high and low levels are usually taken from the positive supply voltage and ground potential, respectively.

While these prior art techniques for identifying the various computer subsystems have been widely employed in the past, neither of the switch or strap circuit techniques are problem-free. Specifically, the strap circuits are inflexible since once set, the identification bits for any computer subsystem cannot be changed without physically altering the subsystem circuit board. Further, when a subsystem circuit board is replaced, it must be replaced with another subsystem circuit board having an identification number not previously used by any of the other circuit boards, thus leading to compatibility problems.

Although the switch circuit technique for providing the identification is more flexible than the strap circuit technique, similar problems exist insofar as two or more computer subsystem circuit boards may potentially be provided with the same identification number. Further, the use of thumb-wheel or toggle switches to provide an identification number is far from reliable, and requires the manual adjustment of each and every computer subsystem circuit requiring identification.

Both of these prior art techniques can potentially number the subsystems in a random manner. For example, the "first" subsystem may be identified as "subsystem No. 21," the second as "subsystem No. 9," and so on, in no particular sequential order. Although a random technique can provide the unique identification of circuit elements, random numbering increases software overhead and requirements such as software reference range.

It is therefore an object of the present invention to overcome the above-mentioned shortcomings of the prior art systems.

It is a further object of the present invention to provide circuit board identification generators on the circuit board of each computer subsystem to be identified for identifying the computer subsystems, the circuit board identification generators being of uniform design for every computer subsystem.

It is a further object of the present invention to provide identical circuit board identification generators on a plurality of computer subsystem circuit boards, the circuit board identification generators being designed and interconnected so as to automatically and sequentially identify each of the circuit boards with a unique identification number. In accordance with the preferred embodiments, the circuit board identity generators identify each computer subsystem automatically upon turning on the computer system.

It is a further object of the present invention to provide a plurality of identical, interconnected circuit board identity generators, the interconnection of the circuit board identity generators automatically and sequentially identifying the associated circuit boards with a unique sequential identification number.

It is a further object of the present invention to provide a plurality of circuit board identity generators for uniquely and sequentially identifying a plurality of associated circuit boards with a unique identification number, each of the circuit boards including one of the circuit board identity generators, the circuit board identity generators having at least one synchronous counter with associated logic circuitry, the synchronous counters and logic circuitry in each of the circuit boards being interconnected to provide automatic and sequential circuit board identification upon turning on the computer system.

It is a further object of the present invention to provide the plurality of synchronous counters in each of the circuit board identity generators for extending the range of circuit board identification numbers.

It is a further object of the present invention to provide additional logic circuitry in each of the circuit board identity generators for adjusting the absolute identification number of the lowest numbered circuit board.

In accordance with the invention, each circuit board in a system includes an identity generator which is enabled and disabled at preselected times to provide a unique code identifying each circuit board. More specifically, each identity generator is successively enabled and thereafter all identity generators are simultaneously disabled to provide the unique identification code.

Further, in accordance with the present invention, each of the circuit board identity generators includes counter means for counting in accordance with a clock signal when enabled for providing a count output. Circuitry is provided for automatically enabling the counter means in each of the identity generators in a predetermined succession, and for automatically disabling the counter means in each of the identity generators at substantially the same time, whereby the count output from each of the identity generators provides a unique identification number for an associated one of the circuit boards.

In accordance with a further aspect of the present invention, the circuity for automatically enabling the counter means in each of the identity generators successively enables the counter means approximately one clock signal period after the counter means in the preceding identity generator is enabled, and the circuitry for automatically disabling the counter means in each of the identity generators disables the counter means substantially within one or two periods of the clock signal after the counter means in all of the identity generators are enabled. When the disabling circuitry disables the counter means within one period of the clock signal, N circuit boards will be identified as circuit boards "N−1" through "0". When the circuitry for automatically disabling the counter means disables the counter means within two periods of the clock signal, N circuit boards will be identified as circuit boards "N" through "1".

In accordance with a specific embodiment of the present invention, the circuitry for enabling and disabling the counter means comprises logic means receiving system signals from a common circuit for providing an enable signal in accordance with the system signal. Further, the counter means includes (i) an enable input receiving the enable signal for selectively enabling and disabling the counter means in accordance therewith, (ii) a clock input receiving a clock signal from the system, and (iii) a count output. The counter means is selectively enabled and disabled at predetermined times, the counter means counting in accordance with the clock signal when enabled, the count output of the counter means providing the identification number.

The counter means further includes presetting means for presetting the count output to a preselected number and an indication output signal applied to the common circuit for indicating that the count output of the counter is at the preselected number. The counter means is preset to the preselected number by the presetting means before being enabled and counts from the preselected number in accordance with the clock signal when enabled.

More specifically, a circuit board identification system is provided with a common circuit, and a succession of circuit boards to be identified connected to the common circuit, each of the circuit boards being provided with one of the circuit board identity generators. The common circuit includes a first bus for supplying a signal to the preset input of each of the counters, a second bus for supplying a clock signal to the clock input of the counters, a third bus providing a count terminate signal derived from the indication output signal from the counter in the last of the succession of circuit boards to the logic means of each of the counters, and a plurality of chain buses, the indication output from the counters in each of the circuit boards except the last of the succession of circuit boards being applied to the logic means of a succeeding counter via an associated one of the chain buses. The counters in each of the circuit boards are automatically enabled in a predetermined succession and automatically disabled in substantial time coincidence, whereby the count output from each of the counters provides a unique identification number for an associated one of the circuit boards.

The logic means in accordance with the present invention may comprise a single two input logic gate, such as a NAND gate, or may be comprised of a delay type flip-flop which receives the count terminate signal and provides a delay output and a two input logic gate which receives the delay output. The output of the NAND gate provides the enable and disable signals to the counting means.

The counting means in accordance with the present invention may comprise a single digital counter integrated circuit such as the Texas Instruments 74191, or may comprise two or more of such digital counters connected in cascade to thereby increase the number of circuit boards which may be identified.

These and the objects of the present invention will be described with reference to the following drawing figures of which.

Figure 1:
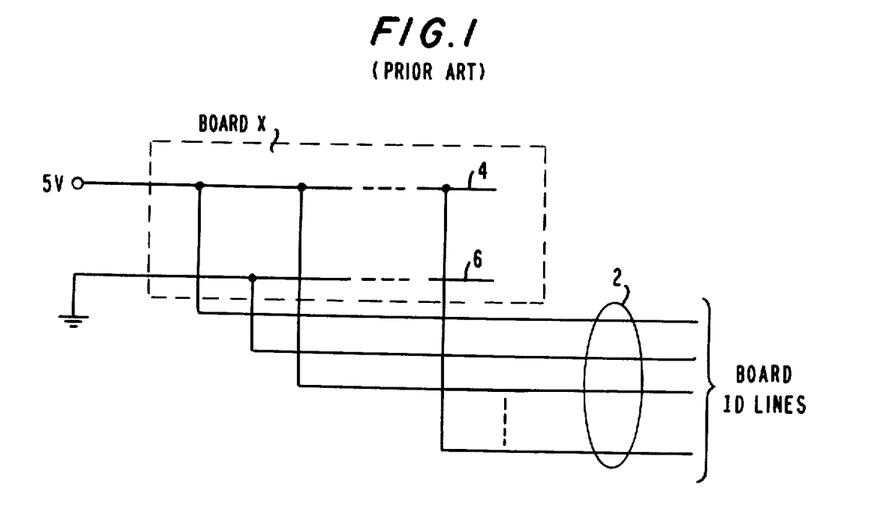
FIG. 1 is a schematic illustration of a prior art "strap" circuit for providing a unique circuit board identification number.

With reference to FIG. 1, a prior art strap circuit technique is illustrated for providing a circuit board identification number in a computer system or other electronic system which requires a number of subsystems to be identified. Circuit board X is identified within the system by providing a plurality of circuit board identification lines 2, each of the lines being permanently connected or "strapped" to either the 5 volt supply bus 4 or ground potential bus 6. In this manner, the board identification lines 2 provide a unique binary word or number ("1011" shown in FIG. 1) by which the board can be identified, the lines applied to the 5 volt supply bus 4 being logical "1," the lines applied to ground potential bus 6 being logical "0."

Figure 2:
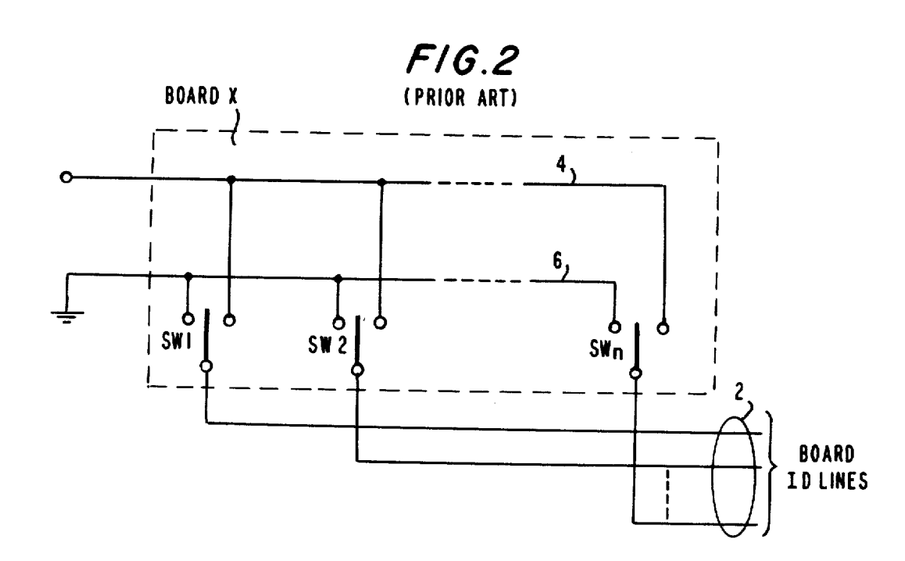
FIG. 2 is a schematic illustration of a prior art "switch" circuit for providing a unique circuit board identification number.

FIG. 2 illustrates a prior art switch circuit, whereby each of the circuit board identification lines 2 are selectively applied to either the 5 volt supply bus 4 or ground potential bus 6 via switches SW1-SWn. The switches SW1-SWn are usually thumb-wheel or toggle switches, and are manually set by the operator to provide any particular circuit board identification number.

While use of the prior art devices illustrated in FIGS. 1 and 2 may be acceptable for very small systems, it can be seen that as the number of circuit boards which must be identified increases, the amount of maintenance required by the identification circuitry increases. That is, in the FIG. 1 arrangement, each of the circuit boards must be manually "strapped" to the supply buses 4 and 6, while in FIG. 2, each of the circuit boards must be manually switched to the buses to provide the appropriate board identification numbers. Clearly, this manual intervention causes problems in reliability due to human error. Also, since the strap circuit technique of FIG. 1 is a permanent circuit modification, such technique is highly inflexible. Finally, while each of the circuit boards wired in accordance with the prior art techniques of FIGS. 1 and 2 may be provided with a unique circuit board identification number, the identification numbers do not necessarily have to be sequential. The use of nonsequential identification numbers results in a decreased software reference range for the circuit boards, and increased software overhead to account therefor.

Figure 3:
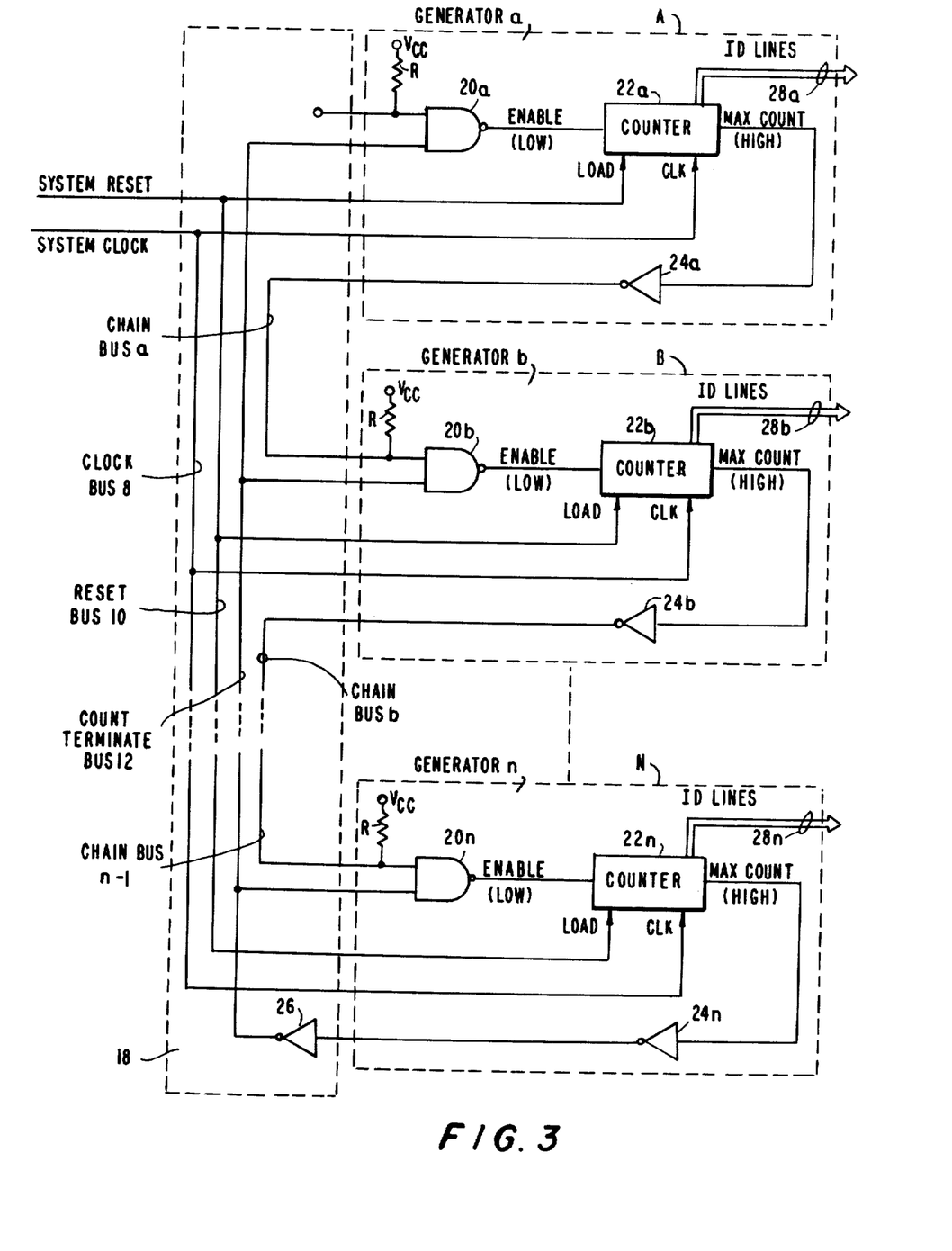
FIG. 3 is a block diagram illustrating the interconnections of a plurality of circuit board identification generators for providing a unique and sequential circuit board identification number for each of the circuit boards in accordance with the present invention.

FIG. 3 illustrates a plurality of circuit boards each having a circuit board identification generator provided in accordance with the present invention, and the interconnections therebetween. The circuit boards referred to herein may be from any particular electronic subsystem. For example, the circuit boards may be controllers for input/output devices such as discs, tape drives, etc., the circuit board identity generators providing a unique sequential identification number for each of the input/output devices. On the other hand, the circuit boards may each be disposed on an associated one of a plurality of identical microprocessors in a multiprocessing system, each of the circuit board identity generators providing a unique and sequential identification number for each of the microprocessors. These two applications of the circuit board identity generators are merely exemplary, the circuitry in accordance with the present invention readily lending itself to use in systems wherever identity numbers need to be provided.

In FIG. 3, N circuit boards ("A" through "N") are interconnected via clock bus 8, reset bus 10, count terminate bus 12 and chain buses a through (n−1), the buses being provided on a common backplane 18. Each circuit board has an associated circuit board identification generator a through n located therein, the circuit board identification generators occupying only a small portion of the associated circuit board. Each circuit board identification generator includes NAND gate 20, counter 22, and inverter 24, the reference numerals for elements 20, 22 and 24 identifying the particular circuit board identification generator, a through n, with which the element is associated, NAND gate 20a being disposed in generator a, NAND gate 20b being disposed in generator b, and so on. An additional inverter 26 is provided in the backplane 18.

Structurally, the system RESET and system CLOCK signals are applied to the LOAD and CLOCK inputs, respectively, of counters 22a-22n via system RESET bus 10 and CLOCK bus 8. The counters 22a-22n receive ENABLE signals from the respective NAND gates 20a-20n. Counters 22a, 22b and 22n provide an identification number on identification lines 28a, 28b, and 28n, respectively, and a MAXIMUM COUNT output which goes high whenever the associated counter attains its maximum count. The MAXIMUM COUNT outputs from generators a through (n−1) are applied to associated chain buses via inverters 24a through 24 (n−1), the output of inverter 24a providing the input to chain bus a, the output of inverter 24b providing the input to chain bus b, and so on. However, the last generator, generator n, applies its MAXIMUM COUNT output to the additional inverter 26 in the backplane 18, via inverter 24n, the output of inverter 26 being applied to the count terminate bus 12. NAND gates 20a-20n each receive a first input directly from count terminate bus 12. All NAND gates except NAND gate 20a in the first generator, generator a, receive their second inputs from the inverted MAXIMUM COUNT output from the previous generator via the associated chain bus, NAND gate 20b receiving the inverted MAXIMUM COUNT output from generator a via chain bus a, NAND gate 20n receiving the inverted MAXIMUM COUNT output from generator n−1 via chain bus n−1. All of the NAND gates 20a-20n also receive a high signal level at the second inputs thereof from voltage supply $V_{cc}$ via resistors R. Since the second input to NAND gate 20a in generator a does not receive an inverted MAXIMUM COUNT signal, the second input thereof is constantly at a high level due to the supply voltage applied thereto.

Figure 4:
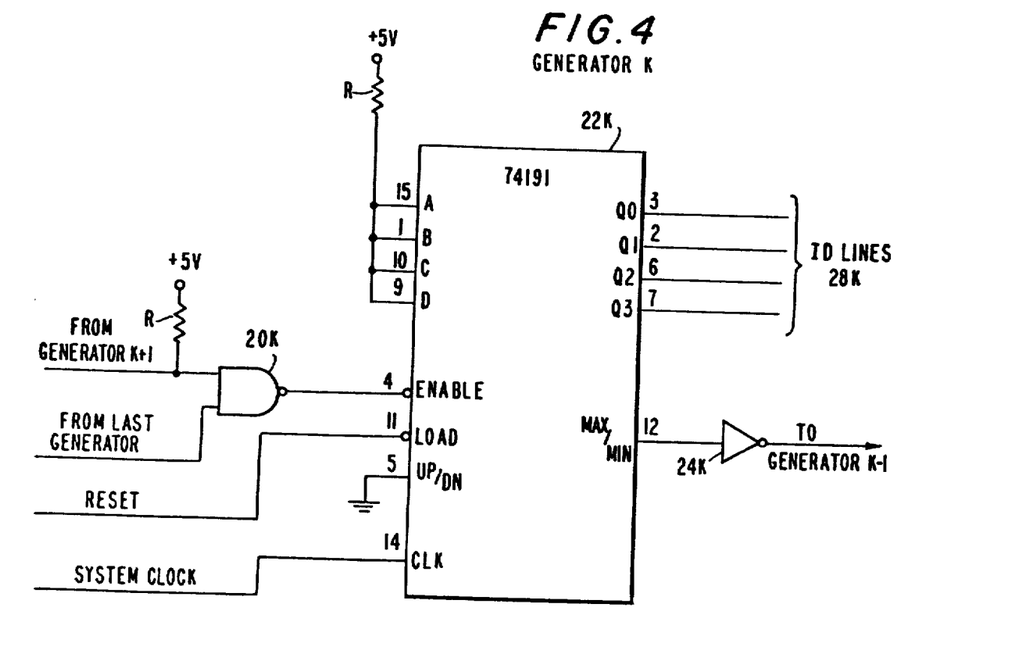
FIG. 4 is a block diagram illustrating the details of one embodiment of the circuit board identity generator used on each circuit board in accordance with the present invention.

Prior to explaining the operation of the system illustrated in FIG. 3, the contents of one of the circuit board identification generators will be more specifically described with reference to FIG. 4. An individual circuit board identification generator (generator k, for example) essentially comprises a synchronous counter 22k having a MAXIMUM COUNT output and preset input, such as the Texas Instruments 74191 integrated circuit 22k. The counter 22k is a four-bit counter which may be preset according to the levels applied to the A–D inputs of pins 15, 1, 10 and 9, respectively, upon a negative going LOAD pulse. Since each of the inputs A–D is tied to the positive voltage supply via resistor R, the count of counter 22k will be preset to "1111" upon a negative-going transistion of the LOAD pulse. This preset count causes the $Q_0$-$Q_3$ outputs on pins 3, 2, 6 and 7, respectively, to produce the number "1111" on identification ouput lines 28k, and also causes the MAXIMUM COUNT indication on pin 12 to go high to indicate that the maximum count has been attained. The counter will begin counting at the positive going transistions of the system CLOCK applied to the CLOCK input at pin 14 whenever the ENABLE input from NAND gate 20k applied to pin 4 attains a low value and the LOAD pulse switches to a high state. Pin 5 is tied to ground to thereby cause the counter 22k to count up, the counter after "1111" being "0000," the next being "0001," and so on.

Figure 5:
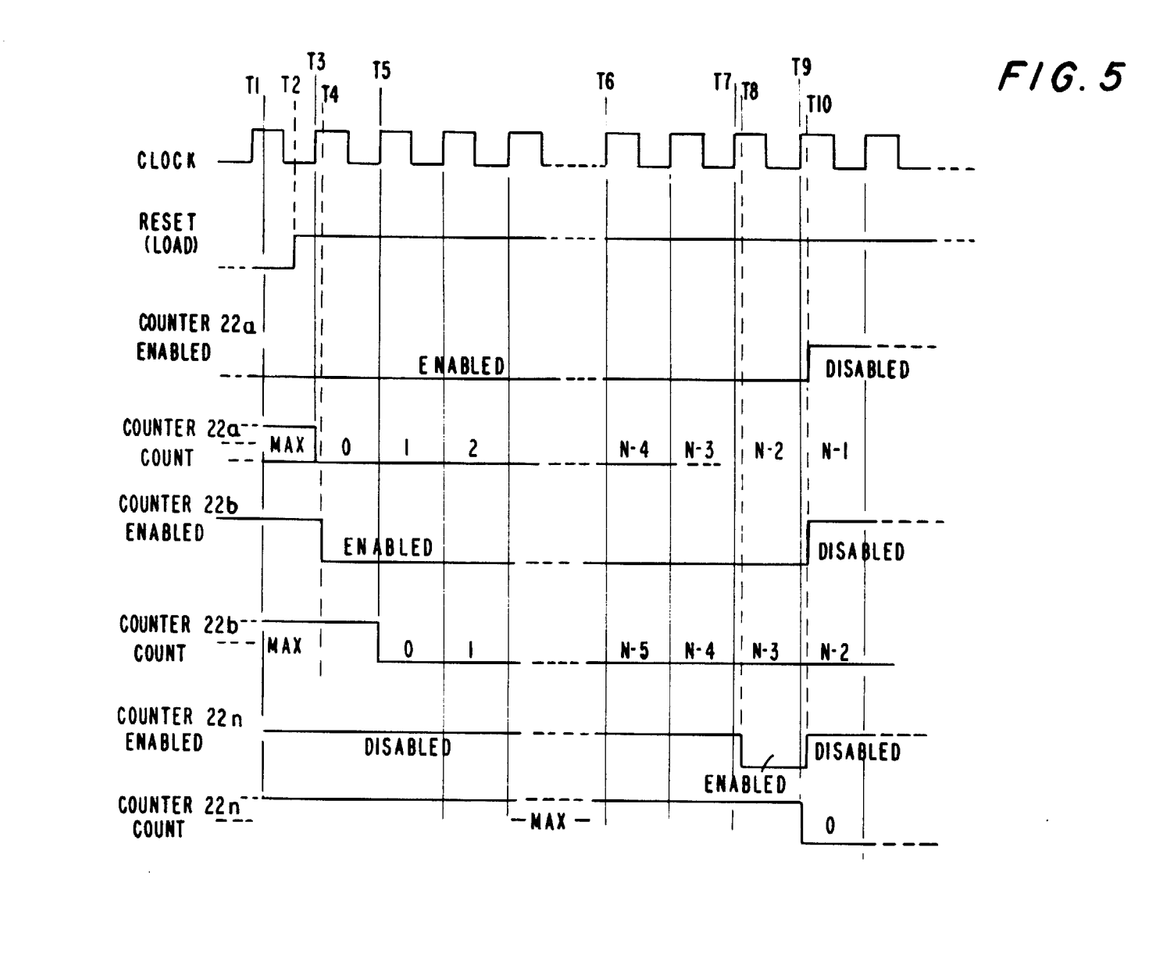
FIG. 5 is a waveform diagram helpful in understanding the operation of the circuit board identity generators of FIGS. 3 and 4.

The operation of the system shown in FIG. 3 will now be explained with further reference to FIG. 5. First, upon the initial turning on of the system, or upon resetting the system, the RESET line provides a low signal level to the LOAD input of counters 22a-22n to thereby load the maximum count into each of the counters as illustrated at time $T_1$, FIG. 5. Consequently, the MAXIMUM COUNT output from each of the counters 22a-22n is high, and the inverted low signal is applied to the chain buses between each of the boards. Since a low signal is applied to one of the inputs of each of NAND gates 20b-20n, the outputs of the associated NAND gates are driven high to thereby disable the associated counters 22b-22n. On the other hand, a high signal level from the output of inverter 26 is applied to the other input of the NAND gates 20a–20n when the counter 22n is at its maximum count. Since the one input to NAND gate 20a is constantly held high, unlike NAND gate 20a cause the gate to provide a low signal level to counter 22a to enable the counter 22a as shown in FIG. 5.

The LOAD signal may be released at time $T_2$ at least 35 ns prior to the rising edge of the clock signal at $T_3$. Counter 22a responds at time $T_3$ to the positive edge of the CLOCK signal to count up from the maximum count to a zero count. At that time, the MAXIMUM COUNT output from counter 22a goes low and the inverted high level signal is applied to chain bus a. In response thereto, the output of NAND gate 20b goes low to enable counter 22b shortly after time $T_3$, at time $T_4$. Counter 22b, now being enabled, responds at time $T_5$ to the positive transition of the CLOCK input to count up from the maximum back to the zero count. Counter 22a, still enabled, counts from 0 to 1. As soon as counter 22b counts from its maximum count to zero, its MAXIMUM COUNT output goes low, and the high inverted output on chain bus b is applied to the succeeding generator. In this manner, the signals on chain buses a through (n−1) successively enable counters 22b–22n.

At time $T_6$, counter 22a in the first generator will have achieved a count of N−4, counter 22b in the next generator b will have achieved a count of N−5, and so on. At time $T_7$, assuming that there are N circuit board identification generators in the system, the counter in the next to the last generator will begin its count from its maximum to zero thereby enabling counter 22n at $T_8$ in a manner identical to that described for generators a and b. Since counter 22n is enabled, it responds to the rising edge of the CLOCK signal at time $T_9$ to count from its maximum count to a zero count. Upon achieving the zero count, the MAXIMUM COUNT output from counter 22n achieves a low state, and soon thereafter, this low state is applied to the count terminate bus 12 via inverters 24n and 26. The low going COUNT TERMINATE signal is applied to each of the NAND gates 20a–20n at time $T_{10}$ to provide a high signal to the ENABLE input of each of the counters 22a–22n, thereby disabling all counters.

It can be seen that counter 22a in the first generator a has attained a count of N−1, counter 22b in the next generator b has attained a count of N−2, and so on, counter 22n in the last generator n having attained a count of zero. Thus, each of the N generators a–n provide sequential identification numbers N−1 through zero, respectively, the identification numbers being available on identification lines 28a–28n.

Figure 6:
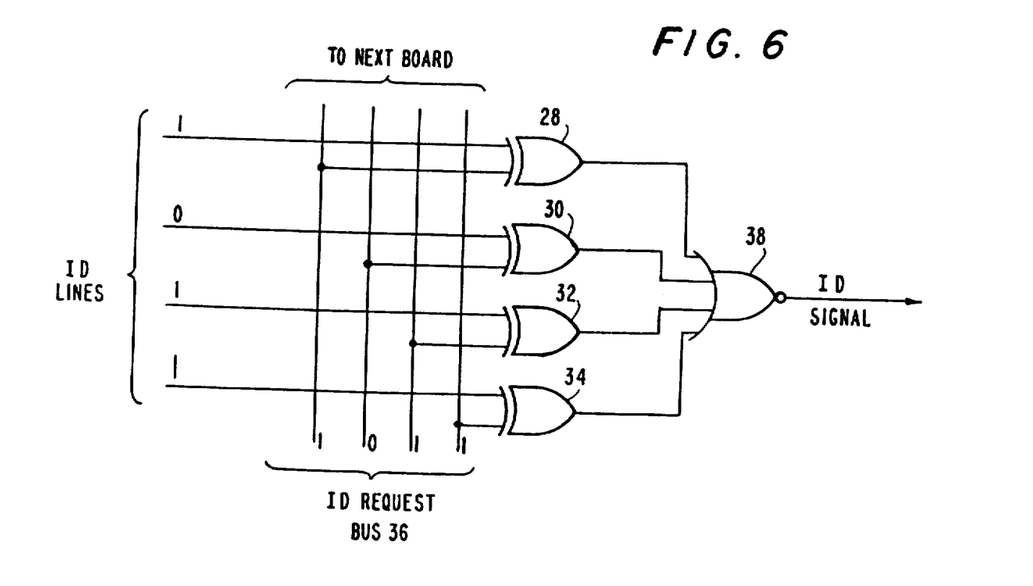
FIG. 6 is a schematic diagram illustrating a technique for employing the circuit board identification number to identify a unique circuit board.

FIG. 6 illustrates one technique for using the identification number to produce an identification signal upon request. Each of the N circuit boards may be provided with exclusive OR gates 28–34, each of the exclusive OR gates receiving one of the identification lines at first inputs thereof. An identification request is applied to an identification request bus 36 common to all boards, the corresponding bits in the identification request bus being applied to the other input of the associated exclusive OR gates 28–34. Whenever the identification number exactly matches the identification request, the output from all exclusive OR gates 28–34 will be low, thereby providing a high output from NOR gate 38 indicating the location of the requested circuit board.

Figure 7:
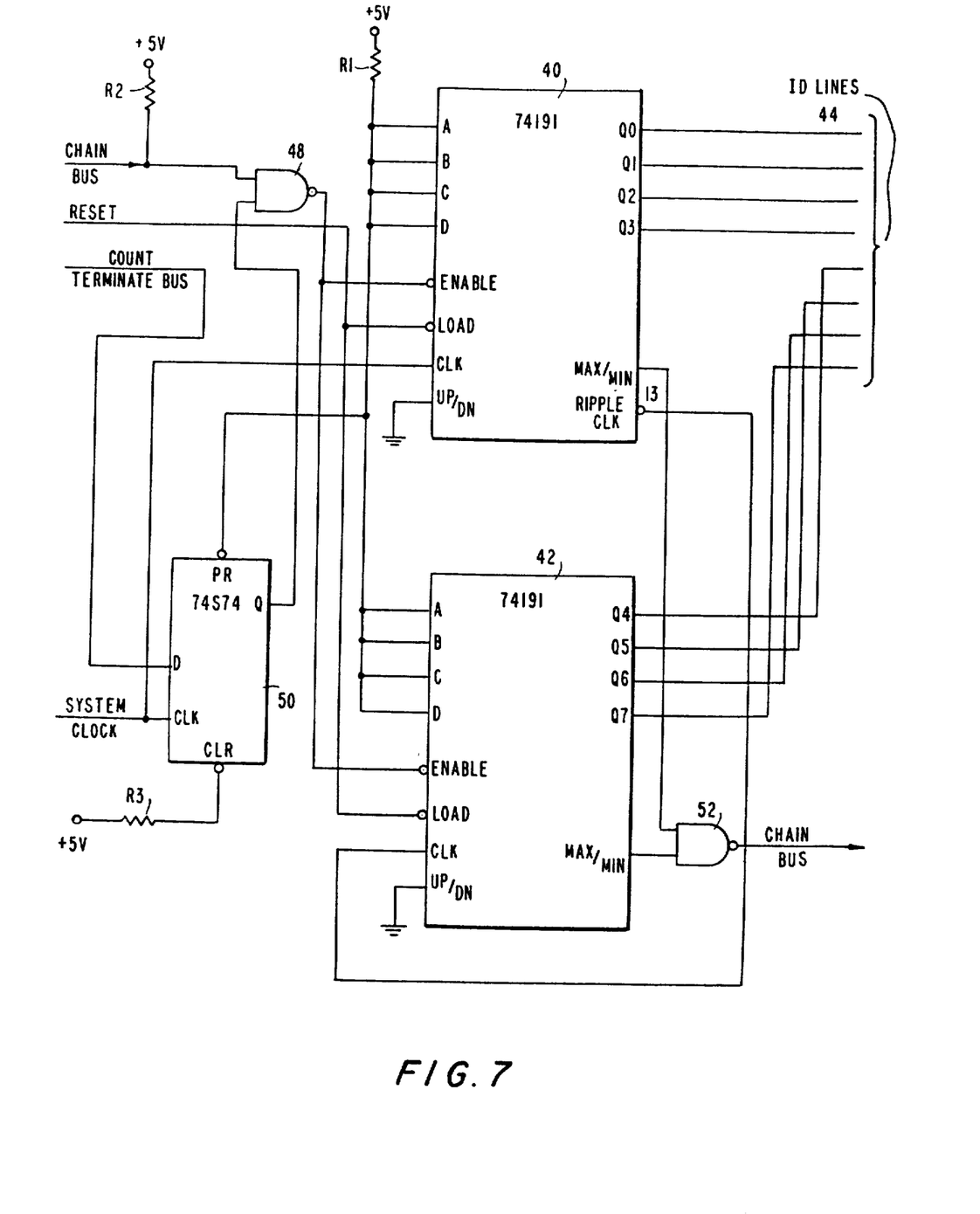
FIG. 7 is a block diagram illustrating a modification to the circuit board identity generators to provide both an extended range for the identification number and for insuring that the lowest numbered circuit board will be identified as board "1"

The circuit board identity generator can be modified to function differently, if desired. For example, FIG. 7 illustrates a circuit board identity generator which has been modified to provide an eight bit identification number, and further modified to number N boards from N to 1, rather than from (N−1) to 0. In the modified circuit board identity generator shown in FIG. 7, a pair of 74191 counters 40 and 42 are cascaded and have their PRESET inputs A–D tied to the positive 5 volt supply via resistor R1 to thereby preset the counters to the MAXIMUM COUNT of "1111" when the RESET signal, applied to the LOAD input of the counters, attains a low value. The $Q_0$–$Q_3$ outputs from counter 40 are combined with the outputs "$Q_4$–$Q_7$", to form identification lines 44. The signal on the chain bus from the previous generator is applied to a first input of NAND gate 48, the first input to NAND gate 48 also receiving the supply voltage via resistor R2. The system RESET signal is directly applied to the LOAD inputs of counters 40 and 42. The signal on the count terminate bus is applied to the D input of delay type flip-flop 50 which may be the 74S74 Dual D Positive Edge Triggered Flip Flop with preset and clear. The system CLOCK is applied to the CLOCK input of flip-flop 50, while the CLEAR and PRESET inputs to the flip-flop are tied to the supply voltage via resistors R3 and R1, respectively. The Q output of flip-flop 50 is applied to the second input of NAND gate 48, the output of the latter being applied to the ENABLE inputs of counters 40 and 42. The system CLOCK is applied to the CLOCK input of counter 40, while the RIPPLE CLOCK output from pin 13 of counter 40 is applied to the CLOCK input of counter 42. The up/down mode inputs to counters 40 and 42 are tied to ground to provide a "count up" function for both counters, and the MAXIMUM COUNT outputs from counters 40 and 42 are applied to respective first and second inputs to NAND gate 52 which provides a chain bus output to the next succeeding circuit board identification generator.

The counters 40 and 42 are cascaded by applying the RIPPLE CLOCK output from pin 13 of counter 40, which provides a negative going pulse for one half of the CLOCK whenever the maximum count (overflow) is reached by counter 40, to counter 42. Thus, the combination of counters 40 and 42 function as an eight bit counter. It is readily apparent that more than two of the counters can be cascaded in this manner to provide an arbitrarily large identification number to accommodate a large number of circuit boards.

The delay type flip-flop 50 is provided to insure that the identification number of the last generator is "1", rather than "0". It should be noted that the flip-flop may be provided for this purpose in either the generators of FIGS. 4 or 7. Similarly, the cascaded counters shown in FIG. 7 may be used without the flip-flop to merely extend the counting range without affecting the value of the lowest identification number.

Figure 8:
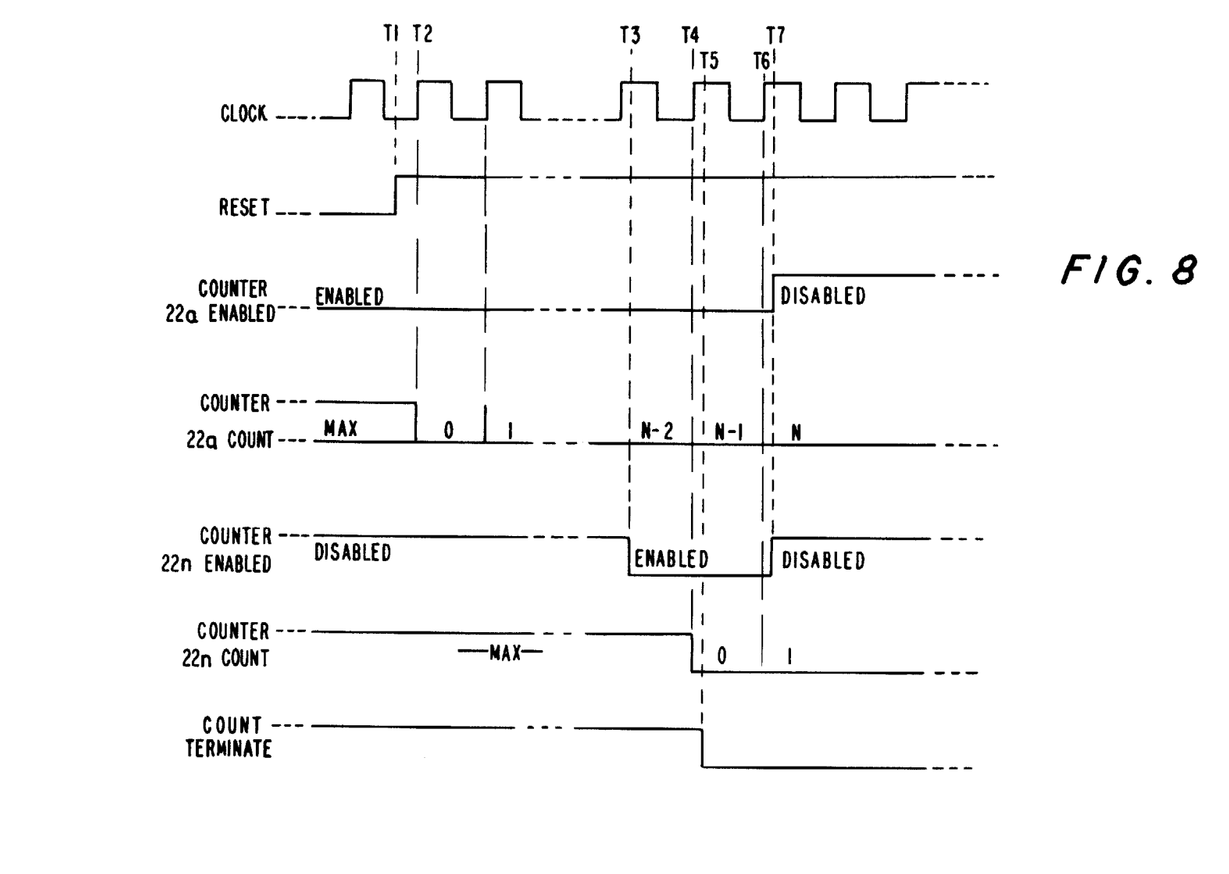
FIG. 8 is a waveform diagram helpful in understanding the operation of the circuit board identity generator shown in FIG. 7.

Operation of the flip-flop 50 in combination with the counters will be described with further reference to FIGS. 3 and 8. The system into which a plurality of the generators of FIG. 7 is disposed will be assumed to be that of FIG. 3. That is, the contents of each generator a–n in FIG. 3 will be shown in FIG. 7. Initially, counter 22a is enabled and all counters 22a–22n attain their MAXIMUM COUNT by virtue of the low RESET signal. As the reset or LOAD signal is released at time $T_1$, counter 22a responds to the positive going CLOCK signal at time $T_2$ by counting from the MAXIMUM COUNT to 0. As the signals on each of the chain buses a−(n−1) propagate through the system, as described with reference to FIG. 5, counter 22n eventually becomes enabled at time T₃, at which time counter 22a has attained the count of N−2. Counter 22n responds to the positive going CLOCK pulse at time T₄ by counting from the MAXIMUM COUNT to 0. Shortly there after, at time T₅, a low going COUNT TERMINATE signal is applied to the count terminate bus. Each of the delay type flip-flops 50 in the associated generators receive the low going COUNT TERMINATE signal from the count terminate bus. The flip-flops 50 respond to the next positive going edge of the CLOCK signal by transfering the low going signal applied to the D input of the flip-flop to the Q output. The low going Q output from each of the flip-flops 50 causes the output of NAND gate 48 to go high to thereby disable all of the counters 22a-22n at time T₇. Prior to being disabled, however, each of the counters 22a-22n is incremented at time T₆, counter 22n counting from 0 to 1, counter 22a counting from N−1 to N.

Therefore, the highest numbered board has an identification number equal to "N", the lowest numbered board an identification number equal to "1", to thereby identify N circuit boards with a sequential series of identification numbers from "1" to "N".

Various changes to the invention described herein may be made within the scope of the present invention. The present invention is not intended to be limited to the embodiments shown and described herein. For example, the inverter 26 may be located on a circuit board, rather than the backplane 18. Such a circuit board will always be identified with the lowest number but can be attached to the backplane at a number of locations. On the other hand, in the arrangement of FIG. 3, the lowest numbered circuit board must be placed in the backplane at the location of inverter 26, but all generators are identical.

While the preferred embodiments have been described in the specification, the scope of the invention shall be defined with the reference to the following claims.

What we claim is:

1. A system for identifying a succession of circuit boards each having an identity generator including counter means for counting in accordance with a clock signal when enabled for providing a count output, said system comprising:
    means for automatically enabling said counter means in each of said identity generators in a predetermined succession; and
    means for automatically disabling said counter means in each of said identity generators at substantially the same time, whereby said count output from each of said identity generators provides a unique identification number for an associated one of said circuit boards.

2. A system for identifying a succession of circuit boards each having an identity generator including counter means for counting in accordance with a clock signal when enabled for providing a count output, said system comprising:
    means for successively enabling said counter means in each of said identity generators approximately one period of said clock signal after said counter means in a preceding identity generator is enabled; and
    means for automatically disabling said counter means in each of said identity generators at substantially the same time substantially within two periods of said clock signal after said counter means in all of said identity generators are enabled, whereby said count output from each of said identity generators provides a unique and sequential identification number for an associated one of said circuit boards.

3. The system of claim 2 wherein said means for automatically disabling disables said counter means within approximately one period of said clock signal after all counters have been enabled, whereby N circuit boards will be provided with unique indentification numbers from 0 to N−1.

4. The system of claim 2 wherein said means for automatically disabling disables said counter means after substantially two periods of said clock signal after all counters have been enabled, whereby said identity generators provide N circuit boards with unique indentification numbers from 1 to N.

5. A circuit board identification system comprising:
    a common circuit; and
    a succession of circuit boards to be identified connected to said common circuit, each of said circuit boards including logic means for providing an enable signal and counter means having (i) an enable input receiving said enable signal for selectively enabling and disabling said counter means, (ii) a clock input, (iii) a count output, (iv) presetting means for presetting said count output to a preselected number, and (v) an indication output signal to indicate that said count output is at said preselected number;
    said common circuit including a first bus for supplying a signal to said preset input of each of said counters, a second bus for supplying a clock signal to said clock input of counters, a third bus providing a count terminate signal signal derived from said indication output signal from said counter in the last of said succession of circuit boards to said logic means of each of said counters, and a plurality of chain buses, said indication output from said counters in each of said circuit boards except the last of said succession of circuit boards being applied to said logic means of a succeeding counter via an associated one of said chain buses,
    whereby said counters in each of said circuit boards are automatically enabled in a predetermined succession and automatically disabled in substantial time coincidence, whereby said count output from each of said counters provides a unique identification number for an associated one of said circuit boards 6. A circuit board identification generator for automatically supplying an identification number for a circuit board in a system having a plurality of circuit boards, said generator comprising:
    logic means receiving signals from said system for providing an enable signal in accordance with said signals; and
    counter means having (i) an enable input receiving said enable signal for selectively enabling and disabling said counter means in accordance therewith, (ii) a clock input receiving a clock signal from said system, and (iii) a count output; wherein said logic means selectively enables and disables said counter means at predetermined times, said counter means counts in accordance with said clock signals when enabled, and said count output provides said identification number.

7. A circuit board identification generator for automatically supplying an identification number for a circuit board in a system having a plurality of circuit boards, said generator comprising:

logic means receiving signals from said system for providing an enable signal in accordance with said signals; and counter means having (i) an enable input receiving said enable signal for selectively enabling and disabling said counter means in accordance therewith, (ii) a clock input receiving a clock signal from said system, (iii) a count output, (iv) presetting means for presetting said count output to a preselected number and (v) an indication output signal applied to said system for indicating to said system that said count output is at said preselected number; wherein said logic means selectively enables and disables said counter means at predetermined times, said presetting means presets said counter means to said preselected number before said counter means is enabled, said counter means counts from said preselected number in accordance with said clock signal when enabled, and said count output provides said identification number.

8. The apparatus of any one of claims 5, 6 or 7, wherein said logic means comprise a two input logic gate.

9. The apparatus of any one of claims 5, 6 or 7 wherein said logic means comprise a delay type flip-flop providing a delay output, and a two input logic gate receiving said delay output, the output of said two input logic gate providing said enable signal.

10. The apparatus of any one of claims 5, 6 or 7, wherein said counter means comprise at least two digital counters connected in cascade.

11. A method for identifying a succession of circuit boards each having an identity generator including counter means for counting in accordance with a clock signal when enabled for providing a count output, said method comprising:

automatically enabling said counter means in each of said identity generators in a predetermined succession; and automatically disabling said counter means in each of said identity generators at substantially the same time, whereby said count output from each of said identity generators provides a unique identification number for an associated one of said circuit boards.

12. A method for identifying a succession of circuit boards each having an identity generator including counter means for counting in accordance with a clock signal when enabled for providing a clock output, said method comprising:

successively enabling said counter means in each of said identity generators approximately 1 period of said clock signal after said counter means in a preceeding identity generator is enabled; and automatically disabling said counter means in each of said identity generatiors as substantially the same time substantially within two clock periods of said clock signal after said counter means in all of said identity generators are enabled, whereby said count output from each said identity generators provides a unique and sequential identification number for an associated one of said circuit boards.

13. The method of claim 12 further comprising disabling said counter means within approximately one period of said clock signal after all counters have been enabled, whereby N circuit boards will be provided with unique identification numbers from 0 to N−1.

14. The method of claim 12 further comprising automatically disabling said counter means after substantially two periods of said clock signal after all counters have benn enabled, whereby said identity generators provide N circuit boards with unique identification numbers 1 through N.

* * * * *